(12) United States Patent
Mantin (10) Patent No.: US 6,731,607 B1
(45) Date of Patent: May 4, 2004

(54) NETWORK INTERFACE AUTO-CONFIGURATION IN AN ACCESS MULTIPLEXING SYSTEM

(75) Inventor: Sharon Mantin, Tel Aviv (IL)

(73) Assignee: Orckit Communications Ltd., Tel Aviv (IL)

( * ) Notice: Subject to any disclaimer, the term of this patent is extended or adjusted under 35 U.S.C. 154(b) by 809 days.

(21) Appl. No.: 09/629,664

(22) Filed: Aug. 1, 2000

(51) Int. Cl.⁷ ............................................... H04L 12/28
(52) U.S. Cl. ....................... 370/254; 710/104
(58) Field of Search ................. 370/216–254, 370/389, 400.2, 430, 419, 431, 462, 463, 532, 535; 375/222; 709/223–5, 100; 710/100–104; 711/100, 147–155, 162, 163; 714/2, 13

(56) References Cited

U.S. PATENT DOCUMENTS

| | | | |
|---|---|---|---|
| 6,181,715 B1 | | 1/2001 | Phillips et al. |
| 6,219,354 B1 | | 4/2001 | Fink et al. |
| 6,424,657 B1 | | 7/2002 | Voit et al. |
| 6,434,221 B1 | * | 8/2002 | Chong ..................... 379/27.01 |
| 6,469,630 B1 | * | 10/2002 | Jeske et al. ................. 340/635 |
| 6,512,739 B1 | * | 1/2003 | Heidari et al. .............. 370/210 |
| 6,522,688 B1 | * | 2/2003 | Dowling .................... 375/222 |
| 6,597,689 B1 | * | 7/2003 | Chiu et al. .................. 370/354 |

FOREIGN PATENT DOCUMENTS

EP 0891067 1/1999 ............ H04M/3/00

OTHER PUBLICATIONS

Clougherty, M. et al., "The Anymedia access System—Providing Solutions for Distribution and Network Independence", Bell Lab Technical Journal, Bell Laboratories, US, vol. 4, NR. 2, pp. 98–126.

Ledieu, J–P J B, "La Nouvelle Gamme De Centraux Temporels De Cit–Alcatel Systeme E10B (Suite)", Commutation et Transmission, Sotelec. Paris, FR, NR. 2, pp. 77–96.

Papa Del J, et al., "DSLAM—A Broadband Digital Subscriber Line Access Multiplexer System", NEC Research and Development, Nippon Electric LTD. Tokyo, JP, vol. 40, NR. 1, pp. 103–107.

* cited by examiner

Primary Examiner—David Vincent
(74) Attorney, Agent, or Firm—Darby & Darby (57) ABSTRACT

Multiplexing apparatus for providing access to a high-speed network over a plurality of subscriber lines. One or more line cards include ports to the subscriber lines, at least one of the line cards including a volatile memory for storing backup configuration parameters of the apparatus. A switching unit includes a non-volatile memory, adapted to store operating configuration parameters. A controller in the switching unit is operative to receive the backup configuration parameters stored in the volatile memory and to update the operating configuration parameters in the non-volatile memory responsive to the backup configuration parameters. The switching unit also includes a communication interface, over which it is coupled to communicate with the network in accordance with the operating configuration parameters so as to link the ports of the line cards to the network.

20 Claims, 5 Drawing Sheets

| Check Sum ||||||
|---|---|---|---|---|---|
| Reserved byte ||||||
| Destination Subnet Mask || Destination IP Address || Gateway IP Address ||
| Out of band routing port IP Address | Out of band routing port Subnet Mask | PPP Routing port IP Address || PPP Routing port Subnet Mask ||
| In band routing port IP Address ||| In band routing port Subnet Mask |||
| Default Gateway | In band Management VPI || PCR value for terminated VP | In band Management VCI ||
| Chains routing port IP Address ||| Chains routing port Subnet Mask |||
| Port 4 Connectivity | Port 4 Signaling support | Port 4 ILMI support | Port 4 BW for CAC Tx | Port 4 BW for CAC Rx |
| Port 3 Connectivity | Port 3 Signaling support | Port 3 ILMI support | Port 3 BW for CAC Tx | Port 3 BW for CAC Rx |
| Port 2 Connectivity | Port 2 Signaling support | Port 2 ILMI support | Port 2 BW for CAC Tx | Port 2 BW for CAC Rx |
| Port 1 Connectivity | Port 1 Signaling support | Port 1 ILMI support | Port 1 BW for CAC Tx | Port 1 BW for CAC Rx |
| Port 0 Connectivity | Port 0 Signaling support | Port 0 ILMI support | Port 0 BW for CAC Tx | Port 0 BW for CAC Rx |
| Deposit configuration Version | M/S || Chain ID | Number of chains ||

FIG. 5

NETWORK INTERFACE AUTO-CONFIGURATION IN AN ACCESS MULTIPLEXING SYSTEM

FIELD OF THE INVENTION

The present invention relates generally to high-speed data communication systems, and specifically to Digital Subscriber Line systems.

BACKGROUND OF THE INVENTION

Digital Subscriber Line (DSL) is a modem technology that enables broadband digital data to be transmitted over twisted-pair wire, which is the type of infrastructure that links most home and small business subscribers to their telephone service providers. DSL modems enable users to access digital networks at speeds tens to hundreds of times faster than current analog modems and basic ISDN service. DSL thus opens the most critical bottleneck in local-loop access to high-speed networks, such as Asynchronous Transfer Mode (ATM) and Internet Protocol (IP) networks, without requiring major investments in new infrastructure. A range of DSL standards have been defined, known generically as "xDSL," wherein the various standards have different data rates and other associated features but share common principles of operation.

DSL subscribers are connected to high-speed networks through Digital Subscriber Line Access Multiplexer (DSLAM) systems. Because of the high cost of network bandwidth, a single DSLAM must typically be designed to serve between 100 and 1000 subscribers and to concentrate their traffic through one or a few high-speed network trunks. The need to serve such a large and potentially variable number of subscribers in the one DSLAM has led to the development of "multi-shelf" access architectures. In the physical implementation of such systems, each of the shelves holds a switching unit and a group of line cards. Each line card has a number of ports that serve network subscribers. Each switching unit links the shelf to the network trunk (either directly or through the switching unit of another shelf) and multiplexes the network connection among the line cards.

In order to reduce maintenance costs, DSLAM systems are typically configured so that, insofar as possible, management and maintenance activities are carried out using a remote management station. Optimally, the management station communicates "in-band" with the switching units, i.e., via the high-speed network. Alternatively, the management station may communicate with the master unit via an "out-of-band" network, such as an Ethernet network, or by a point-to-point (PPP) dial-up connection. The object of this configuration is to minimize the number of service calls that a maintenance engineer or technician must make to the site of the DSLAM.

It is also desirable that the system be designed so that, when a service call turns out to be unavoidable, it can be made by a technician of minimal skill, whose role is limited, for example, to replacement of a card that has been identified as faulty. Each of the switching units typically has its own, unique configuration settings, however. Therefore, when one of the switching units needs to be replaced, the service person must generally program in the configuration of the new unit before it can become operational. The remote management station can only begin to communicate with the new switching unit after the proper configuration has been programmed.

SUMMARY OF THE INVENTION

It is an object of the present invention to provide a network access system that automatically configures itself upon start-up or replacement of components.

It is a further object of some aspects of the present invention to enable a connection to be made automatically, preferably an in-band connection, between the network access system and a management station upon start-up of the system or replacement of components.

It is still a further object of some aspects of the present invention to reduce the need for service personnel on the site of the network access system to reprogram configuration settings of the system after a failure or component replacement.

In preferred embodiments of the present invention, a network access multiplexing system comprises one or more shelves, each shelf comprising a switching unit, linked to the network, and one or more line cards, having ports that serve respective network subscribers. Preferably, the shelves comprise a master shelf, having a master switching unit connected to the network, and a plurality of slave shelves, having slave switching units linked to the network through the master switching unit. For each shelf, the respective switching unit comprises a non-volatile memory, which stores operating configuration parameters for the shelf. At least one of the line cards, and preferably all of the line cards, also comprise memory, most preferably random-access memory (RAM).

The configuration parameters set in the non-volatile memory of the switching unit are backed up in the RAM of the line cards. If it becomes necessary to replace the switching unit, the new switching unit automatically copies the backup configuration parameters from the RAM of the line cards and stores them in its own non-volatile memory. Thus, the configuration of the shelf is maintained, generally without the need for service personnel to enter new configuration settings, and the new switching unit is immediately accessible for remote, in-band access by a management station.

There is therefore provided, in accordance with a preferred embodiment of the present invention, multiplexing apparatus for providing access to a high-speed network over a plurality of subscriber lines, including:

one or more line cards including ports to the subscriber lines, at least one of the line cards including a volatile memory for storing backup configuration parameters of the apparatus; and a switching unit, including:
    a non-volatile memory, adapted to store operating configuration parameters;
    a controller, operative to receive the backup configuration parameters stored in the volatile memory and to update the operating configuration parameters in the non-volatile memory responsive to the backup configuration parameters; and
    a communication interface, over which the switching unit is coupled to communicate with the network in accordance with the operating configuration parameters so as to link the ports of the line cards to the network.

Typically, the ports include Digital Subscriber Line ports.

In a preferred embodiment, the apparatus includes a multi-shelf access system, wherein the one or more line cards and the switching unit together occupy one of the shelves. Preferably, the switching unit includes a master switching unit, which is further coupled to link one or more slave switching units, located on other ones of the shelves, to the network. Most preferably, the operating configuration parameters define an interface configuration between the master switching unit and the one or more slave switching units.

Additionally or alternatively, the switching unit includes a slave switching unit, and the communication interface is coupled to communicate with the network via a master switching unit on another one of the shelves. Preferably, the operating configuration parameters define an interface configuration between the slave switching unit and the master switching unit.

Preferably, the controller is operative to receive the backup configuration parameters and to update the operating configuration parameters upon a start-up of the switching unit. Further preferably, the controller is operative upon the start-up to store the backup configuration parameters in the non-volatile memory in place of the operating configuration parameters previously stored therein. Most preferably, responsive to the backup configuration parameters stored in the non-volatile memory in place of the operating configuration parameters, the switching unit is operative to communicate over the network with a management station following installation of the unit substantially without setting of the parameters by a human operator. Additionally or alternatively, following the start-up, the controller is operative to write the operating configuration parameters to the line cards for storage in the volatile memory.

There is also provided, in accordance with a preferred embodiment of the present invention, a method for providing access to a high-speed network, including:

coupling a switching unit to interface with the network in accordance with operating configuration parameters stored in the switching unit;

linking one or more line cards to communicate with the network through the switching unit, each line card including one or more ports to respective subscriber lines;

storing backup configuration parameters in at least one of the line cards; and upon a start-up of the switching unit, receiving the backup configuration parameters from the at least one of the line cards and, responsive to the received backup parameters, updating the operating configuration parameters.

Preferably, the method further includes:

installing the switching unit in a system already including the at least one of the line cards in which the backup configuration parameters are stored; and responsive to updating the operating configuration parameters after installing the switching unit, establishing communications over the network between the switching unit and a management station substantially without setting of the parameters by a human operator.

The present invention will be more fully understood from the following detailed description of the preferred embodiments thereof, taken together with the drawings in which:

DETAILED DESCRIPTION OF PREFERRED EMBODIMENTS

Figure 1:
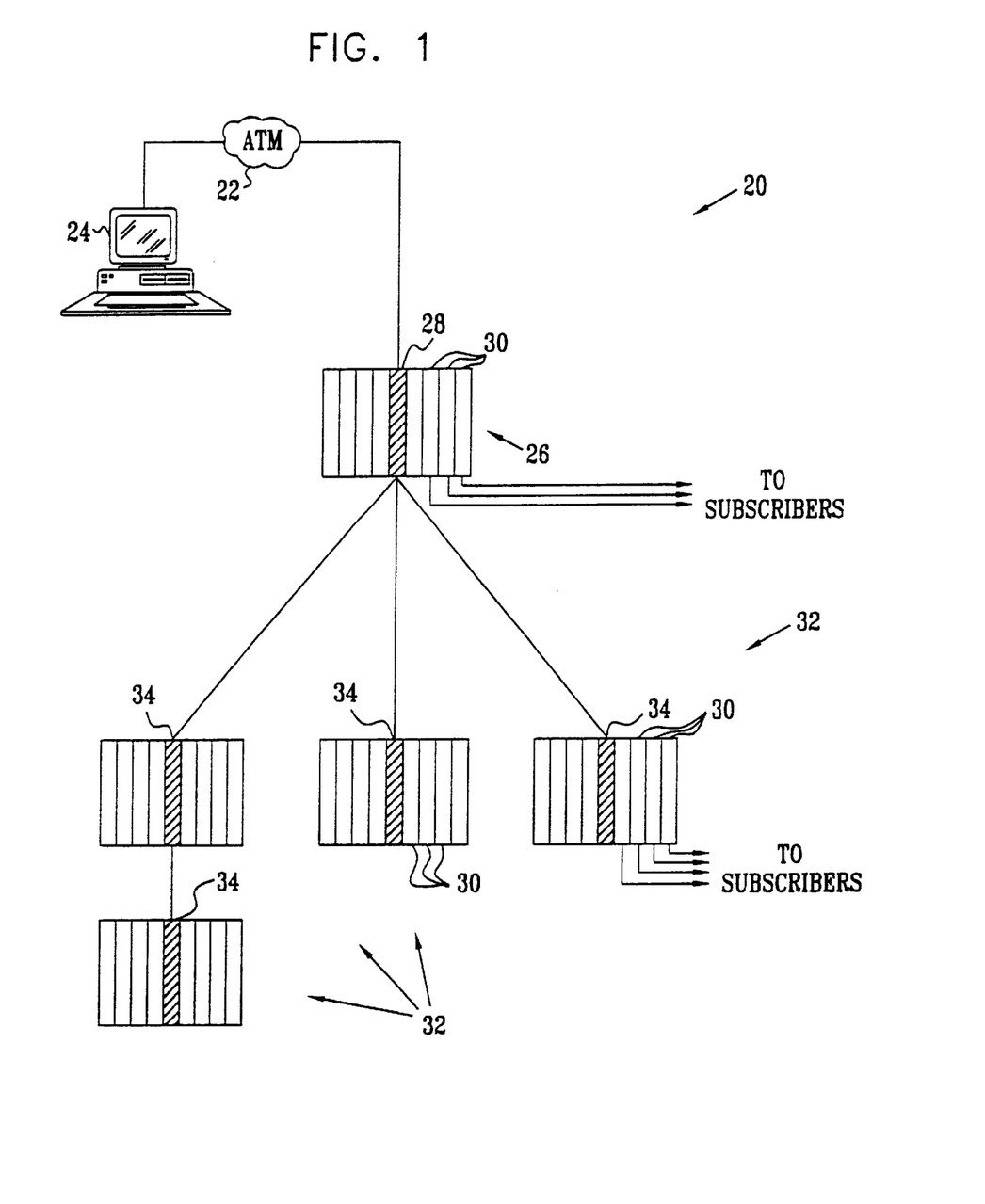
FIG. 1 is a block diagram that schematically illustrates a multi-shelf network access multiplexing system, in accordance with a preferred embodiment of the present invention.

FIG. 1 is a block diagram that schematically illustrates a multi-shelf DSLAM system 20, in accordance with a preferred embodiment of the present invention. System 20 comprises a master shelf 26 coupled to multiple slave shelves 32, which are arranged in a hybrid star/chain configuration. Preferably, slave shelves 32 are arranged in multiple daisy chains, as described in co-pending U.S. patent application Ser. No. 09/472,683, entitled "Bi-Directional Chaining of Network Access Ports," which is assigned to the assignee of the present patent application, and whose disclosure is incorporated herein by reference. For simplicity of illustration, however, FIG. 1 shows only a part of the more complex topology described in the co-pending application.

Master shelf 26 comprises a master switching unit 28 (referred to hereinafter as a master unit), which communicates with a core high-speed network 22, such as an Asynchronous Transfer Mode (ATM) network. The master unit comprises switching equipment that multiplexes the network connection among multiple slave shelves 32. Typically, the master shelf also includes line cards 30 connected to master unit 28, each line card comprising ports that serve network subscribers. Each of slave shelves 32 comprises its own line cards 30 and a slave switching unit 34 (or slave unit) for multiplexing among them.

Management and maintenance of system 20 are preferably carried out remotely, using a management station 24. Optimally, the management station communicates "in-band," via high-speed network 22, with master switching unit 28 (and through it with slave switching units 34). Alternatively, as noted above, the management station may communicate with the master unit via an "out-of-band" network, such as an Ethernet network, or by a point-to-point (PPP) dial-up connection.

Figure 2:
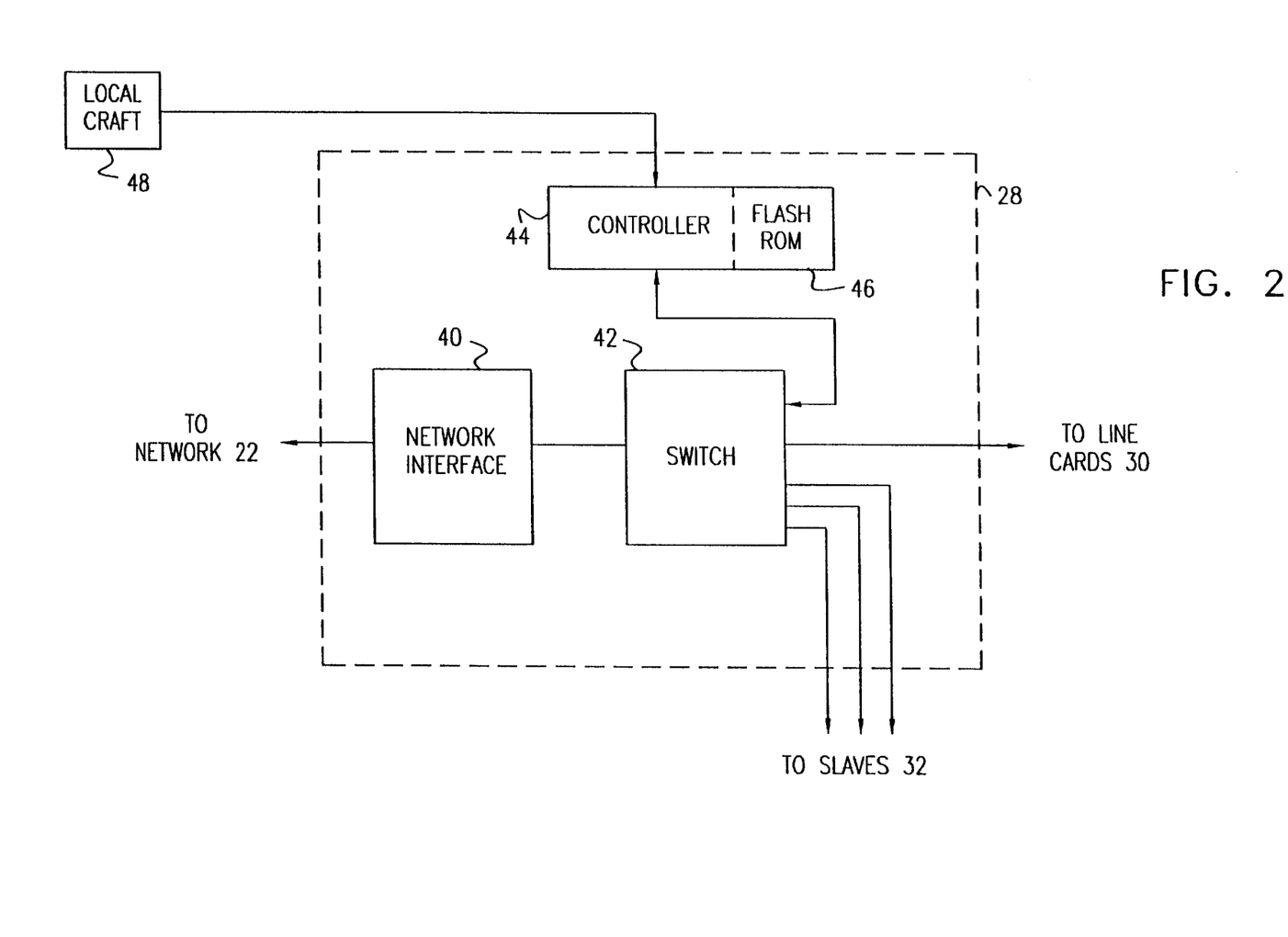
FIG. 2 is a block diagram that schematically illustrates a master switching unit in a multi-shelf network access multiplexing system, in accordance with a preferred embodiment of the present invention.

FIG. 2 is a block diagram that schematically illustrates details of master unit 28, in accordance with a preferred embodiment of the present invention. These details apply mainly to means and methods for auto-configuration of the master unit, and are also applicable, mutatis mutandis, to slave units 34. Further aspects of the master and slave units are described in the above-mentioned U.S. patent application Ser. No. 09/472,683, as well as in co-pending U.S. patent application Ser. No. 09/443,157, entitled "Switch with Serial Output Links and Multi-Dimensional Scheduling," which is assigned to the assignee of the present patent application, and whose disclosure is incorporated herein by reference.

Master unit 28 comprises a core network interface element 40, providing the necessary physical layer (PHY) and data link layer (for example, ATM) functions to interface with network 22. A switching core 42, or concentrator, performs higher-level functions, including VPI/VCI translation for the ATM network. It also multiplexes downstream and upstream packets, or cells, among line cards 30 in master shelf 26, as well as among slave units 34. A controller 44, typically a microprocessor with suitable software, is responsible for configuring the communication interfaces of master unit 28, as well as performing other management functions, as are known in the art. The controller configures the interfaces based on configuration parameters stored in a non-volatile memory 46, preferably a Flash ROM (also known as a Flash Disk).

Controller 44 comprises a local configuration interface, which can be used to set the configuration parameters when master unit 28 is installed or serviced. This function is performed on site by a service person using a "local craft" programming device 48, which connects to the local configuration interface of the controller. The local craft device can also typically be used to carry out diagnostic tests. Whenever possible, however, such testing and configuration setting is carried out by sending special management packets to controller 44 from management station 24 via network 22.

Figure 3:
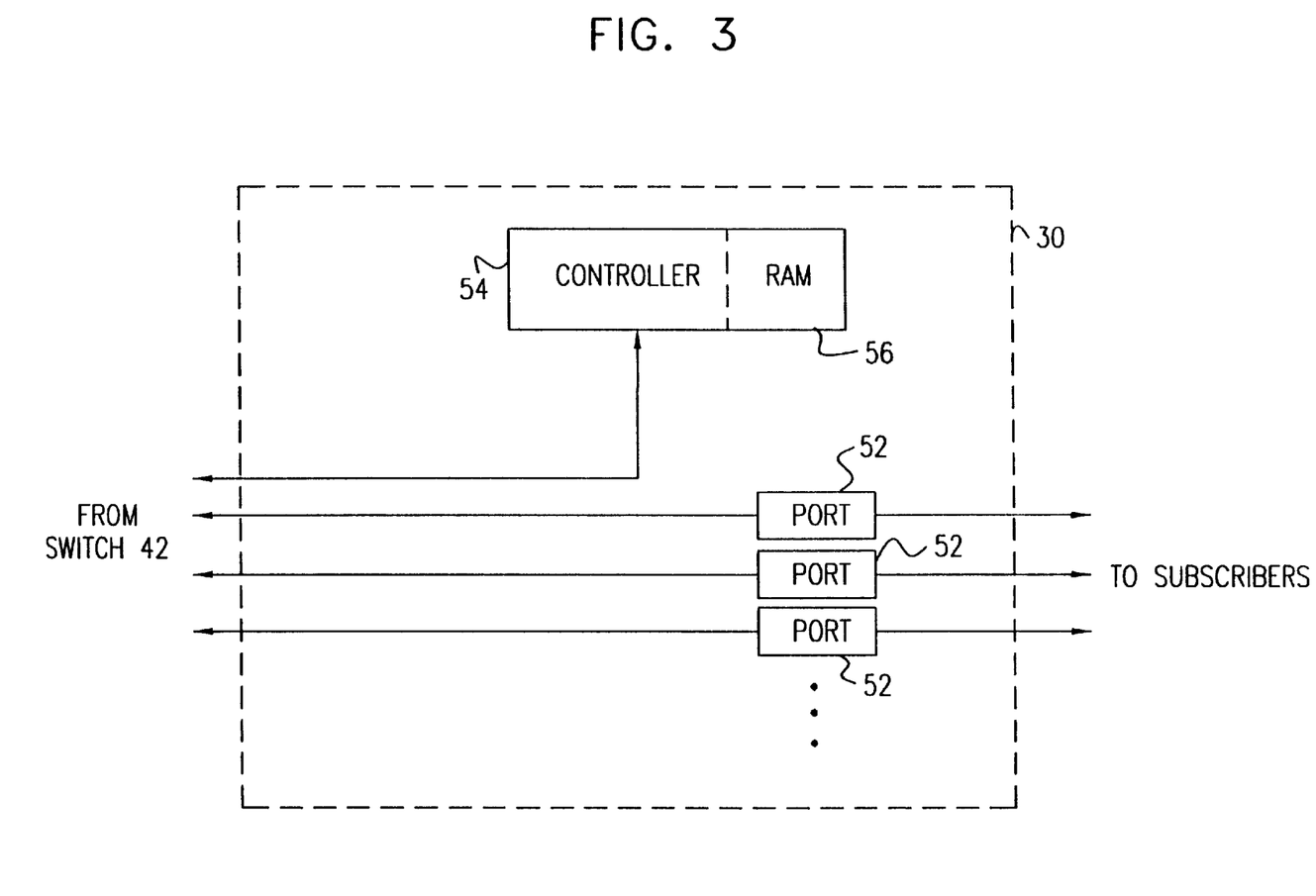
FIG. 3 is a block diagram that schematically illustrates a line card in a multi-shelf network access multiplexing system, in accordance with a preferred embodiment of the present invention.

FIG. 3 is a block diagram that schematically illustrates details of line card 30, in accordance with a preferred embodiment of the present invention. The line card comprises a plurality of ports 52 serving respective subscriber premises, preferably via suitable DSL modems. A controller 54 is coupled to a volatile memory 56, preferably RAM, in which configuration parameters are stored. Memory 56 includes a predefined block holding the configuration parameters of master unit 28. (This description applies to line cards in master shelf 26, while line cards in slave shelves 32 store parameters of the respective slave unit 34.) Transfer of the configuration parameters between non-volatile memory 46 and volatile memory 56 is described hereinbelow.

At power-on of system 20, controller 54 initializes the block of the master unit configuration parameters to a null value. As part of a start-up procedure, after power-on, master unit controller 44 sends a "SET" message to line card controller 54 with the configuration parameters from Flash ROM 46 to be stored in the appropriate block of RAM 56. The set of configuration parameters thus stored is referred to herein as a "deposit configuration." Line card controller 54 saves the parameters in the RAM and returns an acknowledgment message to master unit controller 44. This procedure is preferably carried by all of line cards 30 in the shelf. The parameters stored in RAM 56 are available to be used in a subsequent start-up when master unit 28 is replaced or repaired, as described hereinbelow.

Figure 4:
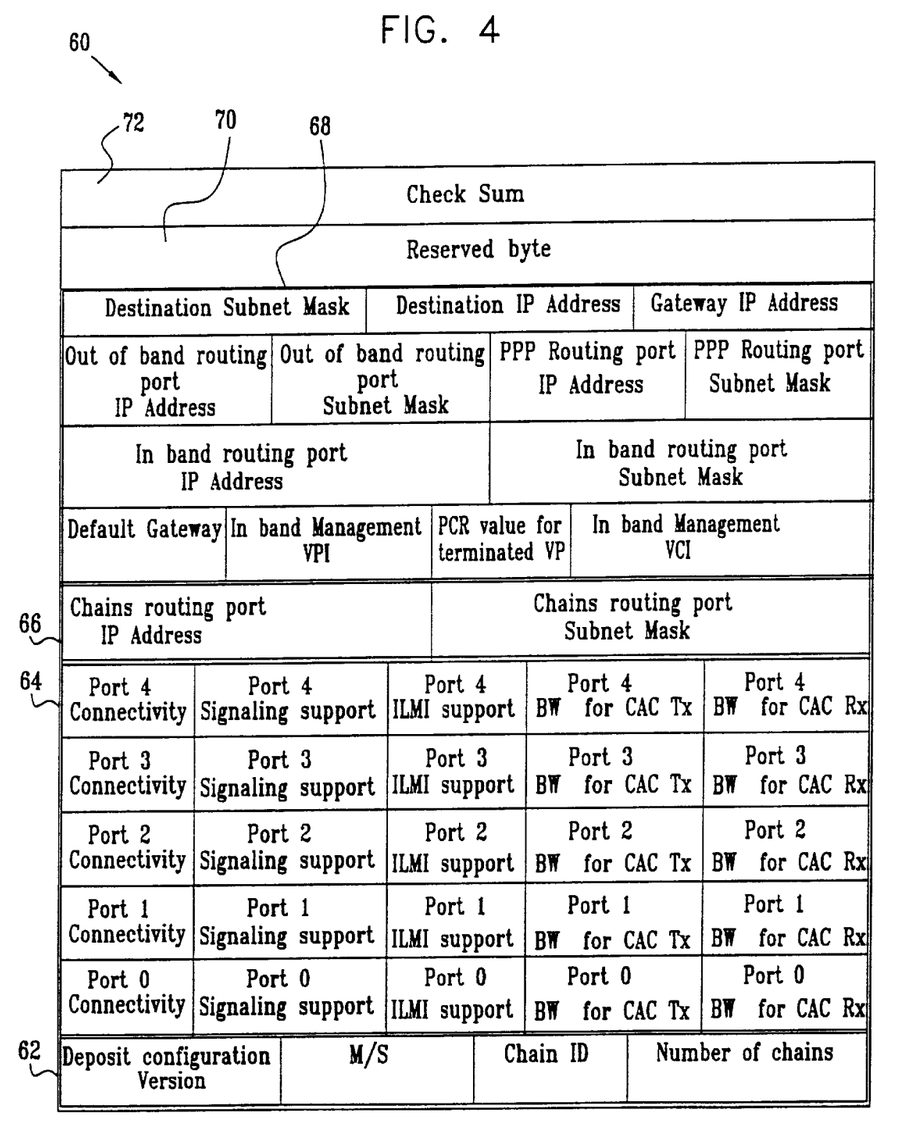
FIG. 4 is a table that schematically illustrates a data structure used to hold configuration parameters, in accordance with a preferred embodiment of the present invention.

FIG. 4 is a table that schematically illustrates a data structure 60 used to hold the deposit configuration in ROM 46 and RAM 56, in accordance with a preferred embodiment of the present invention. The contents of this structure are listed by way of example, and are not in themselves essential to the present invention. Alternative structures for other system configurations and applications, including modification, addition and/or deletion elements of structure 60, will be apparent to those skilled in the art. The key elements of the data structure are as follows:

A general information block 62 comprises parameters such as a deposit configuration version counter; a master/slave (M/S) operational mode identifier; and a chain identifier, as well as a total number of chains in system 20. These chains are groups of chained slave shelves, as described, for example, in the above-mentioned U.S. patent application Ser. No. 09/472,683. The chain identifier preferably gives an internal Internet Protocol (IP) address of slave unit 34.

An interface information block 64 provides information regarding each of the ports on switch 42, preferably five such ports for master unit 28, and two for slave unit 34 (in which case the information regarding the other ports is set to "null.") The five ports of the master unit include one port to network 22 and four ports for slave chains. These ports are in addition to the connections between the master unit and the line cards in the master shelf. The two ports of each slave unit connect to upstream and downstream units in the respective chain, likewise in addition to the connections with the line cards in the slave shelves. Parameters in block 64 typically include:

Connectivity information—whether the port is connected directly or via another shelf to the network, or to a switch in another shelf below it in the chain. Block 64 may also indicate whether the port is configured for a single-mode or multi-mode fiber connection, for example.

Signaling support—whether the port is configured for ATM functionality, and if so, which version.

ATM Integrated Local Management Interface (ILMI)—configuration of the port for this aspect of ATM functionality.

Bandwidth (BW) information for ATM transmission (Tx) and reception (Rx) through this port.

An IP parameters block 66 in master unit 28 contains an internal IP address and subnet mask for routing of packets to the slave chains. For slave units 34, the IP parameters in block 66 together with the chain identifier in block 62 give an internal IP address of slave unit 34, which is used by master unit 28 in routing ATM packets to the appropriate shelves.

A router configuration block 68 in master unit 28 contains routing and address information for use in connecting with management station 24 ("in-band management"), as well as for out-of-band and PPP management station connections, as described in the Background of the Invention. When a packet sent through the router specifies the destination subnet mask and IP address, it is sent to the specified gateway IP address. Otherwise, the router checks the remaining entries in the routing table and, if none of them match the packet, it sends the packet to the default gateway. For slave units 34, which communicate with the management station only through master unit 28, this block is set to "null."

A reserved byte 70, preferably set to 11111111.

A check sum 72.

Figure 5:
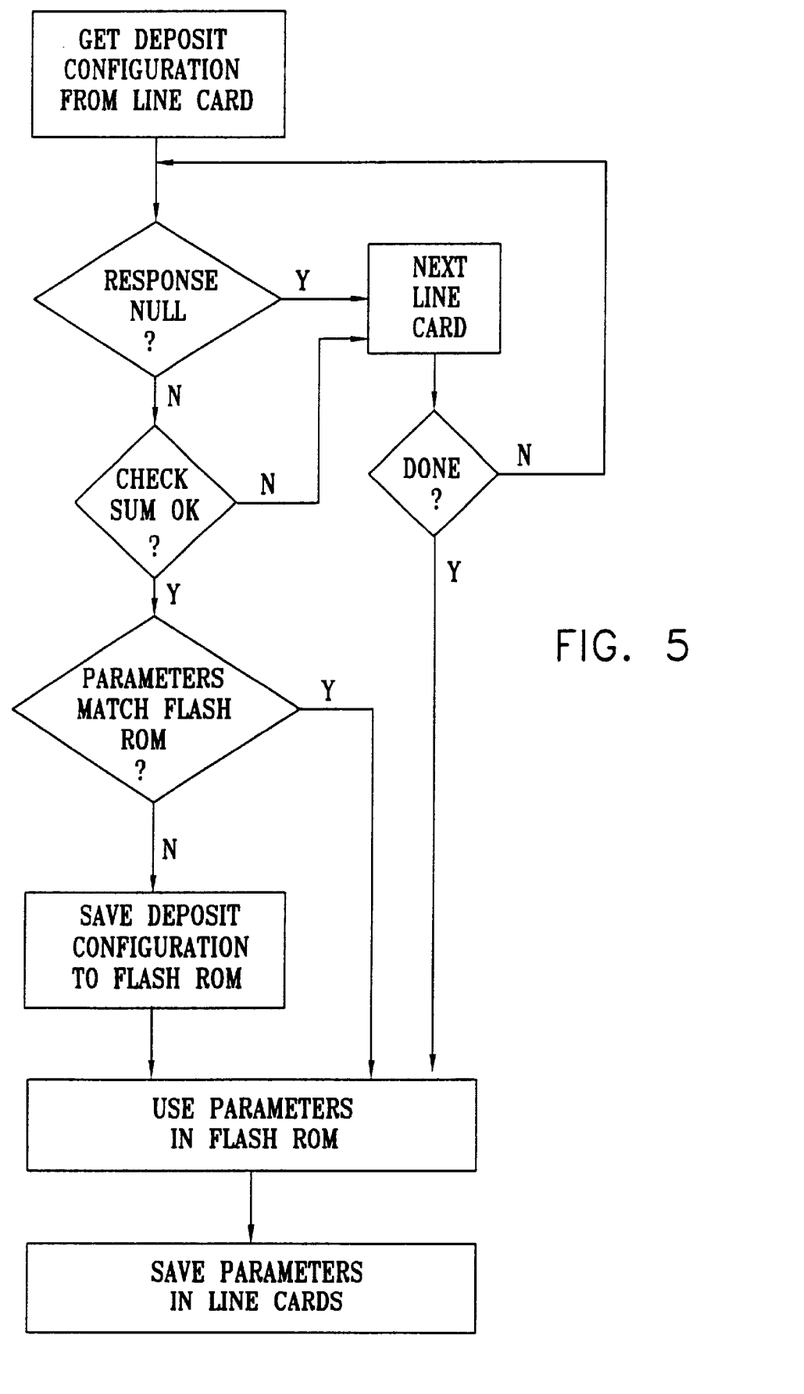
FIG. 5 is a flow chart that schematically illustrates a method for auto-configuration of a switching unit, in accordance with a preferred embodiment of the present invention.

FIG. 5 is a flow chart that schematically illustrates a method for auto-configuration of master unit 28 following replacement or other maintenance, in accordance with a preferred embodiment of the present invention. Slave units 34 are auto-configured in a similar manner. Upon start-up of the master unit, processor 44 sends a "GET" command to line card processor 54 in each of line cards 30 in master shelf 26, asking processor 54 to read and return the deposit configuration stored in its RAM 56. If a power-down occurred prior to start-up, the contents of all of the deposit configurations will be null. In such a case (or if none of the line cards returned valid configuration information for any other reason), master unit processor 44 reads and uses the configuration parameters stored in Flash ROM 46.

If one or more of the line cards in the shelf remained under power, however, their RAMs may contain valid configuration information. As soon as master unit processor 44 has received a valid deposit configuration from one of the line cards, which also has a valid check sum 72, the processor ignores the remaining line cards. It compares the configuration parameters that it received from RAM 56 to those in its own ROM 46. If there is a discrepancy, processor 44 assumes the parameters received from RAM 56 to be more recent than its own, and consequently stores the new deposit configuration parameters in ROM 46. Processor 44 sends the deposit configuration to be stored in RAM 56 on all of line cards 30 in shelf 26. Normal operation of system 20, including access by management station 24, can now proceed.

Thus, when a field technician replaces master unit 28 without powering down system 20 or shelf 26, system 20 is completely self-configuring following the replacement. There is substantially no need for the technician to make any settings (using local craft device 48, for example), as the master unit reads all of its settings from the memory of one of the line cards. Similar results are obtained when one of slave units 34 is replaced.

Although preferred embodiments are described hereinabove with reference to a DSLAM and an ATM network, it will be appreciated that the principles of the present invention may similar be applied to substantially any type of network and any multi-card network access system. While these preferred embodiments relate to a multi-shelf system of a particular topology, it will be understood that a single-shelf system can also benefit from the auto-configuration capability provided by the present invention. In this sense, it is not even necessary that the switching unit and line cards physically occupy a common shelf in an electronic rack, but only that they have the appropriate controllers, memory, and power and data connections to be able to carry out the methods of the present invention.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. Multiplexing apparatus for providing access to a high-speed network over a plurality of subscriber lines, comprising:
   one or more line cards comprising ports to the subscriber lines, at least one of the line cards comprising a volatile memory for storing backup configuration parameters of the apparatus; and
   a switching unit, comprising:
      a non-volatile memory, adapted to store operating configuration parameters;
      a controller, operative to receive the backup configuration parameters stored in the volatile memory and to update the operating configuration parameters in the non-volatile memory responsive to the backup configuration parameters; and
      a communication interface, over which the switching unit is coupled to communicate with the network in accordance with the operating configuration parameters so as to link the ports of the line cards to the network.

2. Apparatus according to claim 1, wherein the ports comprise Digital Subscriber Line ports.

3. Apparatus according to claim 1, wherein the apparatus comprises a multi-shelf access system, and wherein the one or more line cards and the switching unit together occupy one of the shelves.

4. Apparatus according to claim 3, wherein the switching unit comprises a master switching unit, which is further coupled to link one or more slave switching units, located on other ones of the shelves, to the network.

5. Apparatus according to claim 4, wherein the operating configuration parameters define an interface configuration between the master switching unit and the one or more slave switching units.

6. Apparatus according to claim 3, wherein the switching unit comprises a slave switching unit, and wherein the communication interface is coupled to communicate with the network via a master switching unit on another one of the shelves.

7. Apparatus according to claim 6, wherein the operating configuration parameters define an interface configuration between the slave switching unit and the master switching unit.

8. Apparatus according to claim 1, wherein the controller is operative to receive the backup configuration parameters and to update the operating configuration parameters upon a start-up of the switching unit.

9. Apparatus according to claim 8, wherein the controller is operative upon the start-up to store the backup configuration parameters in the non-volatile memory in place of the operating configuration parameters previously stored therein.

10. Apparatus according to claim 9, wherein responsive to the backup configuration parameters stored in the non-volatile memory in place of the operating configuration parameters, the switching unit is operative to communicate over the network with a management station following installation of the unit substantially without setting of the parameters by a human operator.

11. Apparatus according to claim 8, wherein following the start-up, the controller is operative to write the operating configuration parameters to the line cards for storage in the volatile memory.

12. A method for providing access to a high-speed network, comprising:
   coupling a switching unit to interface with the network in accordance with operating configuration parameters stored in the switching unit;
   linking one or more line cards to communicate with the network through the switching unit, each line card comprising one or more ports to respective subscriber lines;
   storing backup configuration parameters in at least one of the line cards; and
   upon a start-up of the switching unit, receiving the backup configuration parameters from the at least one of the line cards and, responsive to the received backup parameters, updating the operating configuration parameters.

13. A method according to claim 12, wherein the ports comprise Digital Subscriber Line ports.

14. A method according to claim 12, wherein linking the one or more line cards comprises installing the line cards and the switching unit together in a shelf of a multi-shelf access system.

15. A method according to claim 14, wherein coupling the switching unit comprises coupling a master switching unit to interface with the network, and further coupling the master switching unit to one or more slave switching units, located on other shelves of the system, so as to link the one or more slave switching units to the network.

16. A method according to claim 15, wherein coupling the master switching unit to the one or more slave switching units comprises linking the master and slave switching units in accordance with the operating configuration parameters.

17. A method according to claim 12, wherein the operating configuration parameters are stored in a non-volatile memory of the switching unit, and wherein storing the backup configuration parameters comprises storing the parameters in a volatile memory of the at least one of the line cards.

18. A method according to claim 17, wherein updating the operating configuration parameters comprises storing the received backup configuration parameters in the non-volatile memory in place of the operating configuration parameters stored therein.

19. A method according to claim 17, wherein storing the backup configuration parameters comprises writing the operating configuration parameters to the line cards for storage as the backup parameters in the volatile memory.

20. A method according to claim 12, and comprising:

installing the switching unit in a system already including the at least one of the line cards in which the backup configuration parameters are stored; and responsive to updating the operating configuration parameters after installing the switching unit, establishing communications over the network between the switching unit and a management station substantially without setting of the parameters by a human operator.

* * * * *